Figure 1:
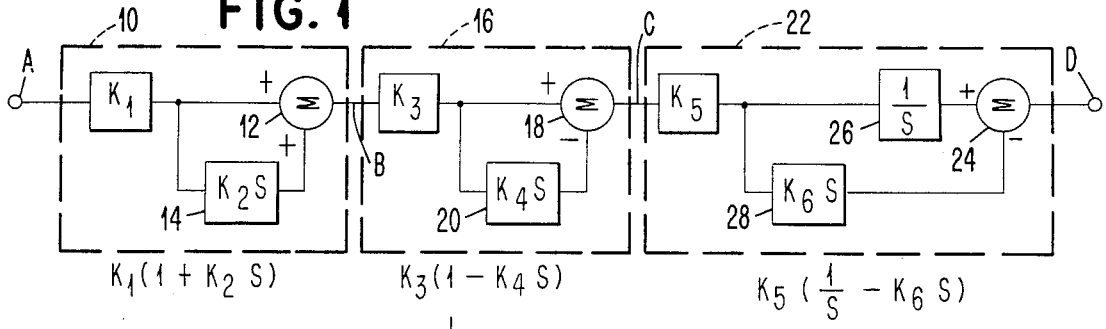
Figure 2:
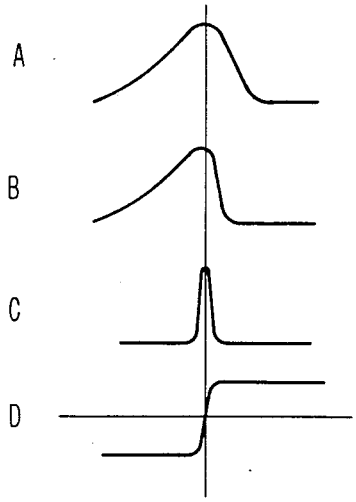
Figure 3:
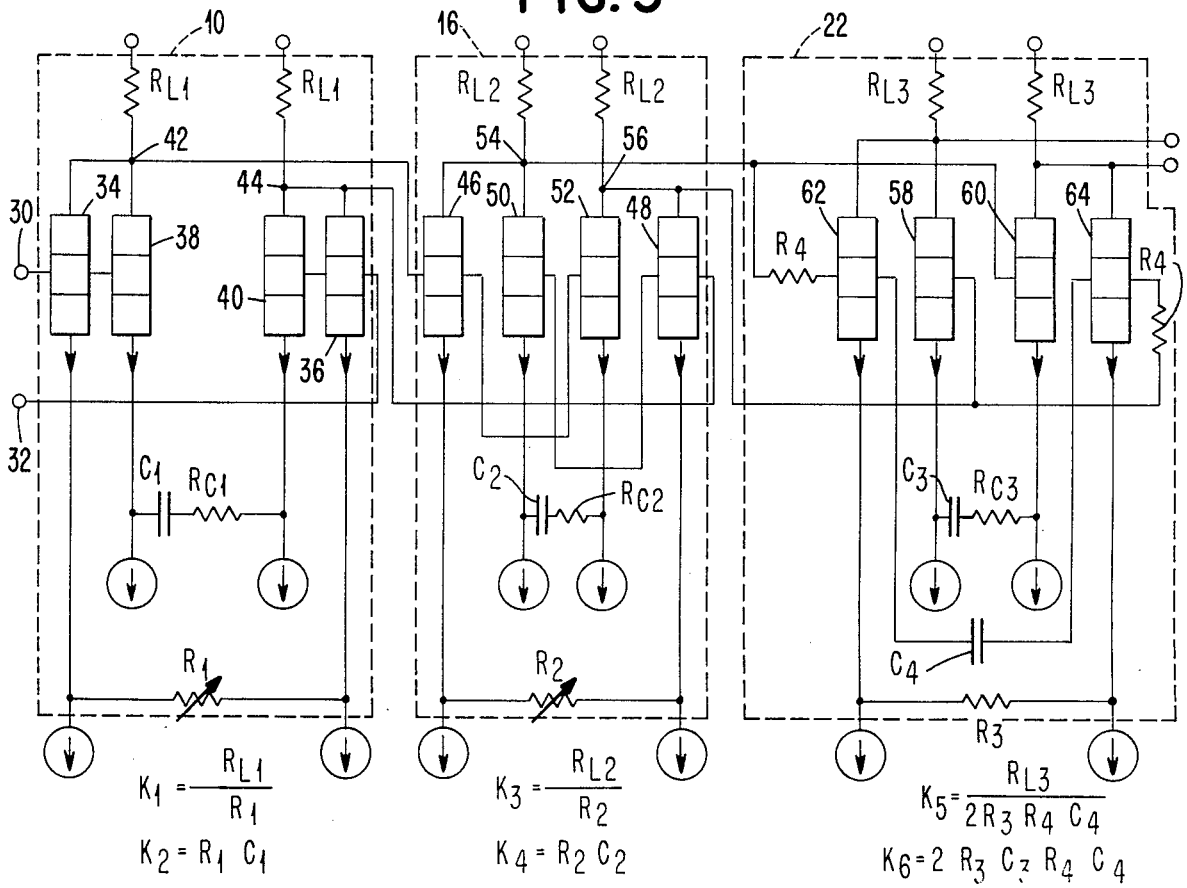

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED FEBRUARY 3, 1976

943 O.G. 75

T943,004

READ SIGNAL EQUALIZATION OR COMPENSATION NETWORK

Richard C. Schneider, Longmont, Colo., assignor to International Business Machines Corporation, Armonk, N.Y.

Filed July 30, 1974, Ser. No. 493,189
Int. Cl. G11b 5/45
U.S. Cl. 360—65
1 Sheet Drawing, 15 Pages of Specification

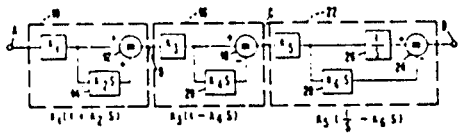

Read signal from a magnetic recording head is equalized or compensated by the circuit shown herein to substantially reproduce the signal recorded on magnetic tape. The equalization circuit must compensate for the derivative function inherent in the head and must also compensate for high frequency roll-off and phase distortion. The derivative function performed by the magnetic read head is compensated by an integration function 22. The high frequency roll-off and phase distortion is compensated by a series of circuits 10 and 16 having in LaPlace transforms a transfer function of the form $$(1+AS)(1-BS)$$

where A and B are constants, and S is the frequency variable $j\omega$. Phase distortion in the read signal appears in the form of asymmetrical pulses. Constants A and B in the above transfer function may be varied by varying circuit components in the equalization network to eliminate the asymmetry in the read signal. In particular, the function $(1+AS)$ may be used to shape the trailing edge of the read signal pulse, while the function $(1-BS)$ may be used to shape the leading edge of the read signal pulse.

READ SIGNAL EQUALIZATION OR COMPENSATION NETWORK

Original Filed July 30, 1974